No. 873,477. PATENTED DEC. 10, 1907.
J. H. WOODWORTH.
CAR WHEEL.
APPLICATION FILED OCT. 17, 1905. RENEWED MAY 13, 1907.
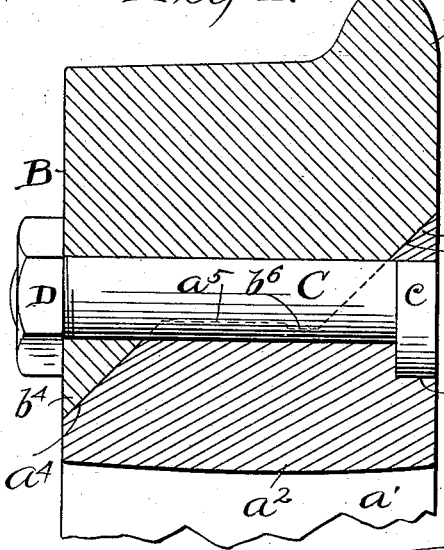
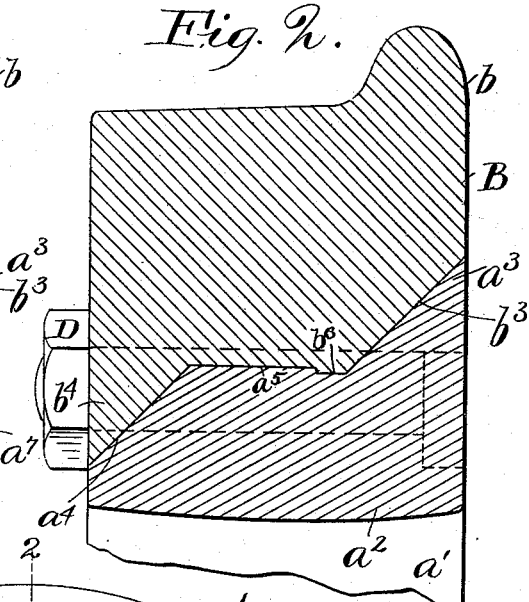
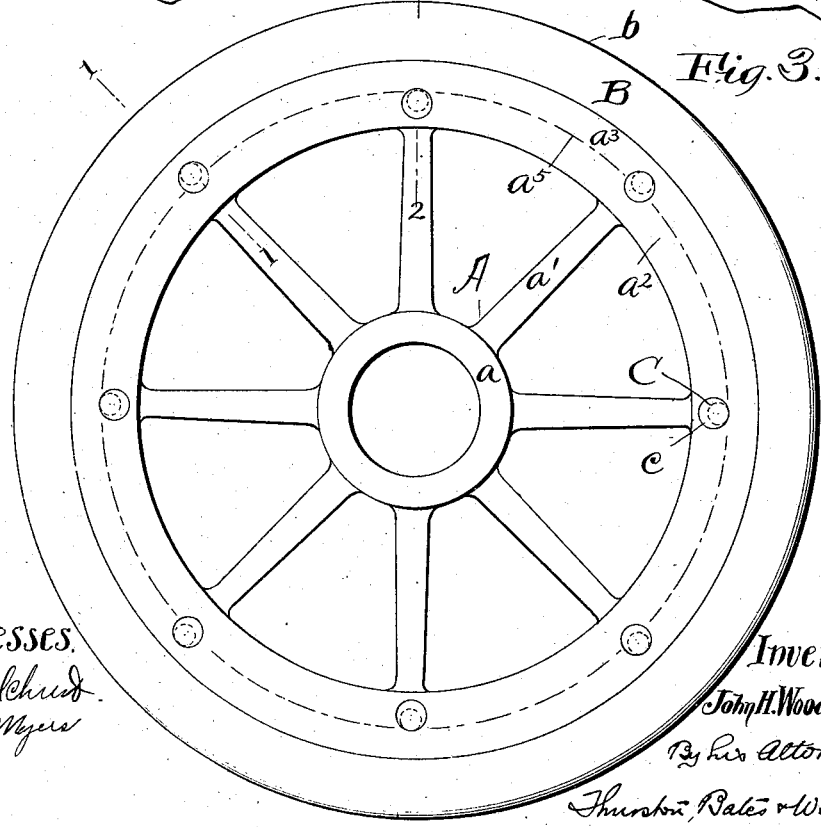

UNITED STATES PATENT OFFICE.

JOHN H. WOODWORTH, OF CLEVELAND, OHIO.

CAR-WHEEL.

No. 873,477.  Specification of Letters Patent.  Patented Dec. 10, 1907.

Application filed October 17, 1905. Serial No. 283,087. Renewed May 13, 1907. Serial No. 373,378.

*To all whom it may concern:*

Be it known that I, JOHN H. WOODWORTH, a citizen of the United States, residing at Cleveland, in the county of Cuyahoga and State of Ohio, have invented a certain new and useful Improvement in Car-Wheels, of which the following is a full, clear, and exact description, reference being had to the accompanying drawings.

Car wheels having cast steel centers and steel tires may be cheaply constructed and are efficient in service so long as the tire does not work loose on the center, but heretofore there have been difficulties in keeping the tire on the center,—the expansion of the tire frequently causing it to become loose, slip, and eventually work off altogether.

The present invention is designed to provide a wheel with a steel tire and simple and efficient means for retaining the tire rigidly on the center.

The invention may be most conveniently summarized as consisting of the means to the above end, as hereinafter more fully explained and as definitely set out in the claims.

In the drawings, Figures 1 and 2 are sections through the rim of a wheel of my improved construction. Fig. 3 is a side elevation of such wheel.

Referring to the parts by letters, A represents the wheel center which may have a hub $a$, spokes $a'$ and a rim $a^2$. Surrounding the rim is the steel tire B having the usual flange $b$. The rim $a^2$ has an outwardly extending beveled flange $a^3$ near its inner edge, while its outer edge is beveled off, as shown in $a^4$. Between these bevels is a cylindrical face $a^5$. The tire has a corresponding cylindrical bore with an inwardly projecting beveled flange $b^4$ near the outer side. The inner edge $b^3$ of the bore is beveled off.

The beveled flanges of the rim and tire correspond in inclination with the beveled edges of such members, as shown. It will thus be seen that there are two sets of coöperating surfaces of considerable size preventing the tire moving toward the inner side of the rim, or, stated otherwise, preventing the wheel center moving toward the outside of the tire. This is, of course, the direction of strain, since the flange engaging the rail holds the tire against outward movement, and the outward tendency of the car makes a strain between the wheel center and the tire.

In running over switches and frogs there is sometimes a tendency of the wheel center to move inward on the tire. To resist this, I form on the inner periphery of the tire on its cylindrical surface a slight inwardly projecting cylindrical rib $b^6$ and I provide a groove in the rim to receive this. When the tire is heated to be shrunk into place it is large enough for the projection $b^6$ to pass over the smooth cylindrical portion $a^5$ of the rim, and thus come opposite the groove. When the tire shrinks into place this rib seats in the groove and securely holds the two parts together.

To make an additional securement between the tire and rim, and to prevent the tire traveling on the rim, I provide a series of bolts C which pass through the wheel from side to side at the junction of the tire and rim. As shown in the drawing, these bolts alternately lie with their major portion in the tire and their major portion in the rim. The former location is shown in Fig. 1, which is a section on the line 1—1 of Fig. 3, and the latter location in Fig. 2, taken on the line 2—2, of Fig. 3.

The bolts C form very effective keys, preventing the tire slipping in the peripheral direction upon the rim, and by being entirely surrounded by the inward flange $b^4$ of the tire and the outward flange $a^3$ of the rim, they form an additional securing means holding the tire against lateral movement or radial movement. The alternate position of the bolts increases their effectiveness in this regard.

Screwing onto the end of the bolt I provide a suitable nut D. This nut is preferably on the outer side of the tire. On the inner side, it is frequently objectionable to have the head of the bolt project, and therefore I may seat this head $c$ in a recess $a^7$ in the rim. In order to prevent the recess for this head from weakening the flange $a^3$ I make the head extending toward the wheel center but not in the opposite direction,— the head being thus an eccentric on the bolt shank. This eccentric head also furnishes means in addition to the tight fit of the bolt preventing it turning when the nut is screwed on.

I claim:

1. In a car wheel, the combination of a center having a rim beveled off at its outer edge and with a beveled projecting flange near its inner edge, a tire having an outward flange to engage the rail, said tire surrounding the rim and being beveled at the inner edge of its bore and having a beveled inwardly projecting flange at the outer edge of its bore, and a series of bolts passing through the two flanges and crossing the junction of the tire and the rim.

2. In a car wheel, the combination of a center having a rim formed with an outwardly projecting flange, a tire from whose bore there extends an inwardly projecting flange, and a series of bolts passing laterally through the rim and tire and through such flanges, said bolts being staggered to alternately have their major portion in the rim and in the tire.

3. In a car wheel, the combination of a wheel rim, a tire surrounding the same, each of such members having a flange extending across the body of the other and having engaging portions intermediate of such flanges, and bolts extending crosswise through the tire and rim, said bolts lying partly in the tire and partly in the rim at such intermediate portions.

4. In a wheel, the combination of a center having an outwardly projecting beveled flange near one side of the rim, the other edge of the rim being beveled off, and a tire beveled off at one edge of its bore and having an inwardly projecting beveled flange near the other edge of its bore, and bolts extending through the tire and rim at the plane of their division intermediate of the bevels thereof, whereby at such intermediate portion the bolts are partly in the tire and partly in the rim.

5. In a car wheel, the combination of a rim having at its periphery near its inner side an outward flange, and a tire seating on said rim and engaged by said flange, and a series of bolts passing laterally through the rim and tire, said bolts having eccentric heads occupying corresponding recesses in the rim.

6. In a car wheel, the combination of a center having at the inner edge of the periphery of the rim an outwardly projecting flange, a tire having at the outer edge of its bore an inwardly projecting flange, and a series of bolts passing laterally through the rim and tire, said bolt near one end being entirely in the rim and near the other entirely in the tire and intermediately partly in each.

7. In a car wheel, the combination of a center having at the inner edge of the periphery of the rim an outwardly projecting beveled flange, the outer edge of the rim being beveled off, a tire having at the outer edge of its bore an inwardly projecting beveled flange, the inner edge of this bore being beveled off, a series of bolts passing laterally through the rim and tire, said bolts near one end being entirely in the rim and near the other entirely in the tire and intermediately partly in each, recesses in the inner face of the rim extending eccentrically from the bolt hole toward the wheel center, there being eccentric heads on the bolts occupying such recesses.

In testimony whereof, I hereunto affix my signature in the presence of two witnesses.

JOHN H. WOODWORTH.

Witnesses:
ALBERT H. BATES,
H. B. SULLIVAN.